May 25, 1937.　　　　T. L. FAWICK　　　　2,081,581
FREEWHEEL DRIVE FOR AUTOMOBILES
Filed Feb. 21, 1931
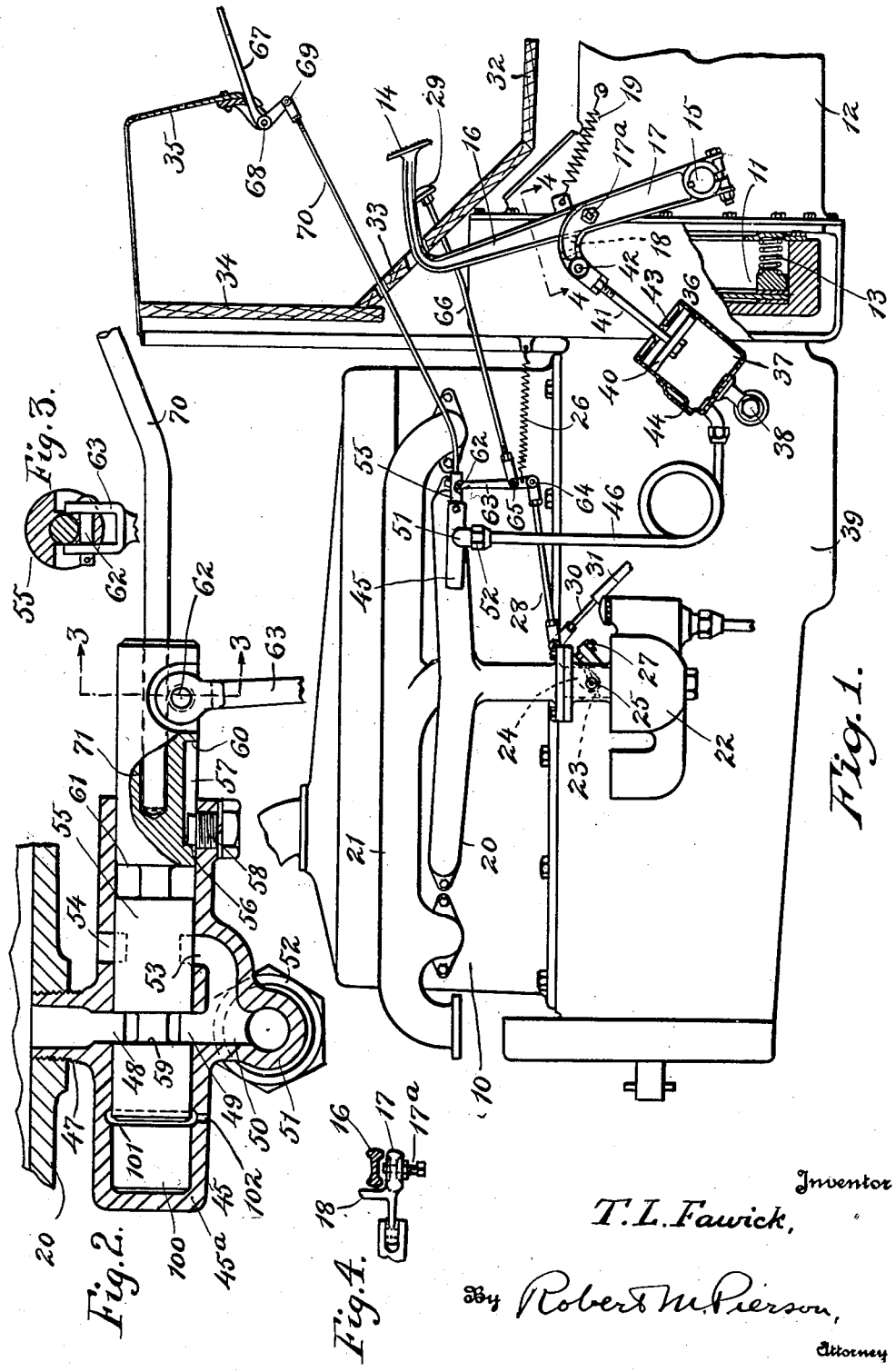
Inventor
T. L. Fawick,
By Robert M. Pierson,
Attorney Patented May 25, 1937

2,081,581

UNITED STATES PATENT OFFICE 2,081,581

FREEWHEEL DRIVE FOR AUTOMOBILES

Thomas L. Fawick, Akron, Ohio, assignor to Bragg-Kliesrath Corporation, South Bend, Ind., a corporation of New York Application February 21, 1931, Serial No. 517,529

4 Claims. (Cl. 192—.01)

This invention relates to motor-vehicles, and especially those driven by internal-combustion engines. Its main object is to provide improved means for releasing the engine and allowing the vehicle to proceed under its own momentum when the engine-power is reduced, without the usual separate declutching operation.

Devices of this class are known as free-wheel drives. Heretofore they have commonly involved the use of one or more one-way or automatic over-running clutches of the wedge and roller variety. These devices are rather expensive and apt to get out of order. When provision is made for disabling the free-wheeling device so that the engine can be used as a brake in descending hills, the shifting means heretofore employed has been complicated and inconvenient to operate. Servo devices such as a piston or diaphragm subject to the engine vacuum and controlled by the accelerator pedal have also been proposed for operating the main clutch, but without provision for leaving the usual clutch pedal retracted when the device operates, and such arrangements have been lacking in the improved disabling means included in this invention.

In its preferred embodiment, my present invention accomplishes free wheeling by operating on the main friction clutch found on all such vehicles, with a simple servo device such as a cylinder and piston subject to the engine vacuum, under control of a valve operated by the accelerator pedal or other engine-throttle actuator, in such manner that the clutch is released whenever the throttle is moved to its idling position while the engine is running. For shifting to ordinary operation it is only necessary to disable the servo-motor control valve in the manner hereinafter described. When the servo device operates, the usual clutch pedal may remain retracted. The invention can thus be applied to existing vehicles or built into new ones by the mere addition of a few simple devices.

Of the accompanying drawing, Fig. 1 is a side elevation, partly in section, showing the power-plant, clutch and controls of an automobile provided with a preferred form of my invention.

Fig. 2 is an enlarged horizontal section of the servo-motor controlling valve and its immediate connections.

Fig. 3 is a section on the line 3—3 of Fig. 2.

Fig. 4 is a section on the line 4—4 of Fig. 1.

In the drawing, 10 is a multicylinder internal-combustion engine having its crank-shaft connected through an ordinary friction clutch 11 and the usual shafting and gearing with the ground wheels of the vehicle, there being the usual manually-operable speed-changing and reversing gear mechanism enclosed in a gear box 12 mounted in the rear of the flywheel housing.

The clutch 11 is yieldingly engaged by a suitable spring or series of springs of which one is shown at 13 in Fig. 1, and is releasable at the will of the driver by foot pressure exerted on a pedal 14 through a rock-shaft 15 connected with the clutch throw-out devices. In this case the clutch-pedal arm 16 is loosely mounted on the rock-shaft 15, and a separate arm 17 is keyed to the shaft alongside of it, said arm 16 in its forward movement being adapted to engage a lug 18 on arm 17 when the pedal is operated by foot pressure, and being held back in a stationary position by a spring 19 when the clutch is released by the servo-motor. However, by means of a set screw 17ª, the two arms can be connected to operate as one, in which case the clutch-pedal will be depressed whenever the servo-motor is energized.

20 and 21 are respectively the intake and exhaust manifolds of the engine 10, 22 is a carburetor connected with the inlet manifold and having the usual throttle valve 23 between its mixing chamber and the manifold entrance for controlling the power of the engine. 24 is the throttle arm on the valve shaft 25, 26 is a spring for moving the throttle toward its closed position and 27 is an arm-engaging stop-screw for holding the throttle in its idling position. 28 is a push-rod forming a part of the foot-operated connection between the throttle arm 24 and an accelerator or pedal device 29, and 30 is another push-rod adapted to be connected with the usual hand-throttle control arm on the steering column (not shown) and containing a telescope slip-joint 31 which allows the throttle-valve to be operated by the foot accelerator independently of said hand-throttle arm. In Fig. 1 are shown portions of the horizontal and the inclined floor boards 32, 33, the dashboard 34 and the instrument board 35.

For a servo device I prefer to employ a simple piston motor, preferably actuated by differences of gaseous fluid pressure because of the resulting rapid charging and discharging of said motor. 36 is such a motor including a cylinder 37 having a bottom projection pivoted at 38 to the lower part of the engine crank-case 39 in order to permit a swinging movement of said cylinder. 40 is the motor piston in said cylinder, connected by a rod 41 with a pivot pin 42 on the free end of the clutch-operating arm 17. Said rod is guided in the head 43 of the cylinder, which is provided with suitable vent-openings for the admission of atmospheric pressure to the space above the piston. 44 is a spring-closed check-valve controlling an opening provided in the side of the cylinder for venting the space below the piston and permitting the later to descend freely under foot pressure at times when the normal pipe outlet from said space may be blocked by the servo-motor control valve hereinafter described.

While any available source of pressure fluid could be employed for the servo-motor, I prefer to make use of the difference between atmospheric pressure and the engine vacuum in the intake manifold 20, which is transmitted by way of a control-valve device 45 and a pipe 46 leading therefrom to the lower end of cylinder 37, said pipe being sufficiently flexible to accommodate the very slight swinging movement of the cylinder.

The casing or cylinder 45a of the control-valve device is formed with a short threaded pipe connection 47 by which it is screwed into a hole in the intake manifold 20. Said connection contains a passage terminating in a port 48 in the side of the casing, opposite to which is located another port 49. The latter enters a passage 50 branching outwardly to the interior of a threaded inlet pipe branch 51 detachably coupled at 52 to the cylinder pipe 46, and branching inwardly to a casing port 53 located opposite to an atmospheric casing port 54. 55 is a piston valve slidable in the casing and having a shoulder 56 at one end of a longitudinal groove 57 formed in the side of the valve, said shoulder being normally held by the spring 26 against the end of a stop-screw 58, in a position in which a circumferential groove 59 of said valve registers with the two ports 48 and 49 to connect the lower end of the cylinder 37 with the interior of the manifold 20. When said valve is pushed inwardly until its inner end abuts against the end wall of the casing (or until the stop-screw 58 is encountered by the outer shoulder 60 of groove 57) the groove 59 is carried out of register with said ports and a second circumferential groove 61 formed in the valve registers with the two ports 53 and 54 and connects the lower end of cylinder 37 with the atmosphere.

For operating the valve 55, its rearwardly-projecting stem is pivoted at 62 to the upper end of a floating, differential lever 63 having the rear end of the throttle push-rod 28 suspended from its lower end by a pivot pin 64. Lever 63 is connected with the forward end of the throttle-retracting spring 26 and also, by means of a pivot pin 65, with the forward end of a push-rod 66 upon whose rear end the accelerator pedal 29 is mounted. Thus a lost-motion connection is provided whereby, when the accelerator pedal is pushed forward, the valve 55 is first shifted to the forward end of its stroke, whereupon the pin 62 acts as a fixed fulcrum for the floating lever 63 and a further forward movement of the accelerator pedal then causes the throttle-valve to be opened. The forward end portion of the valve casing 45a acts with the end of valve 55 as a dash-pot to prevent said valve from too suddenly reaching the end of its outstroke, before the throttle begins to open, said dash-pot being vented by leakage past the piston end of the valve. An internal circumferential groove 101 in the valve casing, communicating with the atmosphere through a port 102, defines the entrance to the dash-pot cylinder and prevents the manifold vacuum from reaching said cylinder.

For disabling the servo clutch motor 36 without affecting the throttle-operating connections when it is desired to control the clutch pedal 14 solely by foot power in the ordinary way, and allow the engine to be used as a brake when the vehicle is descending grades, I provide a hand lever 67 pivoted at 68 upon a bracket fixed on the front side of the instrument board 35, said lever having a long handle-arm projecting rearwardly within easy reach of the driver and a short arm pivoted at 69 to the rear end of a push-rod 70 whose forward end is telescopically fitted in a longitudinal bore or socket 71 formed in the servo-motor control valve 55, the forward end of said rod being substantially bottomed against the end of its socket as shown in Fig. 2 when the valve is in its rearward or vacuum-connecting position. When the handle-arm of lever 67 is turned down to push the rod 70 and the valve 55 forwardly and place said valve in its atmosphere-connecting position, the short arm of said lever will have been brought substantially into line with the rod 70, so that these parts will be held in their disabling position until such time as the operator may desire to restore the functioning of the servo-motor 36 by moving the hand-lever 67 to the position indicated in Fig. 1. In that position the telescopic connection between valve 55 and rod 70 permits the valve to be moved back and forth without interference from said rod.

In the operation of my invention, assuming the throttle-valve 23 to be held in its idling position by the spring 26, the servo-motor control valve 55 will then also be held by said spring in its rearward position against the stop-screw 58, as indicated in the drawing, so that the lower end of cylinder 37 will be connected with the vacuum in the intake manifold 20 and piston 40 will be pushed down by the atmospheric pressure above it to hold the clutch in its released position. If the vehicle is in motion it will then proceed under its own momentum, free from connection with the engine. Whenever the driver desires to reconnect the engine with the ground-wheels, he steps on the accelerator pedal 29, the motion of which, through the floating lever 63, first shifts the valve 55 to cut off the vacuum from cylinder 37, re-establish the atmospheric pressure below the piston 40 and allow the springs 13 to re-engage the clutch. Continued forward movement of the accelerator opens the throttle and speeds up the engine to drive the vehicle. If the operator desires to hold out the clutch while accelerating the engine, he can easily arrest its engaging movement by holding the pedal 14 with his foot. Declutching is automatically accomplished by removing foot pressure from the accelerator pedal, the resulting retraction of the floating lever 63 first closing the engine throttle to its idling position and then shifting the servo-motor valve 55 to restore the engine vacuum to the lower end of cylinder 37. The automatic vent-valve 44 permits easy declutching by foot pressure when the valve 55 may be in an intermediate position with neither of its grooves 59 or 61 in register with their respective casing ports.

This device permits the gears to be shifted without resistance whenever the engine is idling, and it allows the vehicle to be stopped while in gear without touching the clutch pedal or stalling the engine, after which the gears may either be placed in neutral or shifted to a lower ratio, also without clutch motion, preparatory to starting the vehicle again. Declutching by servo power is accomplished at will not only with any fixed gear ratio but also during all shifting from any lower to a higher gear while the vehicle is being brought up to speed. Fatigue of the operator is thereby greatly reduced and the changes are more quickly effected.

The added apparatus incident to the use of this invention is less complicated, less expensive, and less liable to derangement than that required for other free-wheeling devices, no redesigning of the main driving mechanism with consequent obsoleting of expensive equipment and existing stocks of spare parts is necessary, and the disabling of the free-wheeling feature is more easily effected.

Further advantages are that the driver may use the engine as a brake in the usual way without disabling the valve 55 with hand-lever 67, by merely holding the accelerator pedal 29 at a point where the throttle valve 23 is in its idling position while valve 55 remains in its forward position, and that if the engine should stop while the vehicle is free-wheeling, the failure of vacuum in the servo-motor will automatically cause the clutch to become engaged and re-start the engine, whereupon free-wheeling will automatically be resumed.

The invention may be used with any prime-mover employing a clutch, and it applies to all sorts of power vehicles, including passenger automobiles, trucks, tractors, etc.

The described form of embodiment may be widely varied without departing from the scope of the invention as defined in the claims.

I claim:

1. In an automobile, the combination of an internal-combustion engine having a throttle-valve and a clutch, a throttle-valve actuator, a clutch-releasing servo-motor and controller therefor normally subject to said actuator, and means including a manually operated element and mechanical connections for freeing said controller from subjection to the actuator.

2. In an automobile, the combination of an engine having a throttle-valve and a clutch, a declutching motor having a control valve differentially interconnected with said throttle-valve, and a dash-pot for retarding the movement of said control valve.

3. In a pneumatically operated clutch-actuating device for motor cars comprising a pneumatically operated power developing element connected to a movable clutch-actuating member, a valve for controlling said element, a carburetor throttle and motion transmitting mechanism by which the movements of said controlling valve and said throttle are automatically timed with reference one to the other so that the clutch is closed before the throttle is opened and only opened after the throttle has been closed to idling position, the combination, with said above described apparatus, of a manually operable device for moving said controlling valve; whereby said power developing element may be controlled either automatically or manually.

4. In an automobile equipped with a hydrocarbon internal combustion motor of the compression type, a manually operable apparatus for controlling the speed of said motor, a power transmission clutch for connecting said motor with the driving axle of said automobile, a vacuum operated servo-motor operatively connected to one member of said clutch for disconnecting said motor from said axle, a connection from the vacuum space of said servo-motor to the intake manifold of said first mentioned motor and to the atmosphere, and valve apparatus for completely closing either one of said connections and subsequently opening the other which is manually controllable independently of said first mentioned manually operable apparatus, the combination, with said above described apparatus, of a device connecting said valve apparatus with said manually operable apparatus, so that the former can be automatically operated by manipulation of the latter.

THOMAS L. FAWICK.